United States Patent
Degges, Jr. et al.

(10) Patent No.: US 9,830,924 B1
(45) Date of Patent: Nov. 28, 2017

(54) MATCHING OUTPUT VOLUME TO A COMMAND VOLUME

(71) Applicant: Amazon Technologies, Inc., Reno, NV (US)

(72) Inventors: Ronald Joseph Degges, Jr., Los Gatos, CA (US); Kerry H Scharfglass, Mountain View, CA (US); Eric Wang, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 385 days.

(21) Appl. No.: 14/096,623

(22) Filed: Dec. 4, 2013

(51) Int. Cl.
*G10L 21/00* (2013.01)
*G10L 25/00* (2013.01)

(52) U.S. Cl.
CPC ............. *G10L 21/00* (2013.01); *G10L 25/00* (2013.01)

(58) Field of Classification Search
CPC ....................................................... G10L 25/00
USPC ............................... 704/275; 84/741; 381/57
See application file for complete search history.

(56) References Cited

U.S. PATENT DOCUMENTS

| | | | | |
|---|---|---|---|---|
| 2,866,001 A * | 12/1958 | Smith | | G10L 19/02 381/103 |
| 6,011,853 A * | 1/2000 | Koski et al. | | 381/56 |
| 2003/0066414 A1* | 4/2003 | Jameson | | G10H 3/125 84/741 |
| 2005/0063556 A1* | 3/2005 | McEachen | | H03G 3/30 381/104 |
| 2007/0014420 A1* | 1/2007 | Brown | | H04R 27/00 381/110 |
| 2008/0240458 A1* | 10/2008 | Goldstein | | H04R 25/453 381/72 |
| 2008/0285772 A1* | 11/2008 | Haulick | | G01S 7/52003 381/92 |
| 2009/0022330 A1* | 1/2009 | Haulick | | H04M 9/082 381/57 |
| 2010/0223054 A1* | 9/2010 | Nemer et al. | | 704/219 |
| 2013/0094668 A1* | 4/2013 | Poulsen | | H03G 3/301 381/107 |
| 2013/0179164 A1* | 7/2013 | Dennis | | G01C 21/3608 704/234 |
| 2014/0044269 A1* | 2/2014 | Anderson | | 381/57 |
| 2014/0303971 A1* | 10/2014 | Yi | | H04M 1/605 704/233 |
| 2014/0372109 A1* | 12/2014 | Iyer | | H03G 3/32 704/225 |
| 2015/0010169 A1* | 1/2015 | Popova | | H04S 7/303 381/107 |

* cited by examiner

*Primary Examiner* — Pierre-Louis Desir
*Assistant Examiner* — Forrest F Tzeng
(74) *Attorney, Agent, or Firm* — Pierce Atwood LLP (57) ABSTRACT

A speech recognition system that automatically sets the volume of output audio based on a sound intensity of a command spoken by a user to adjust the output volume. The system can compensate for variation in the intensity of the captured speech command based on the distance between the speaker and the audio capture device, the pitch of the spoken command and the acoustic profile of the system, and the relative intensity of ambient noise.

21 Claims, 7 Drawing Sheets

MATCHING OUTPUT VOLUME TO A COMMAND VOLUME

BACKGROUND

Computing devices may employ techniques to identify the words spoken by a human user based on the various qualities of a received audio input. Such techniques are called speech recognition or automatic speech recognition (ASR). Speech recognition combined with natural language processing (together referred to as speech processing) techniques may allow a user to control a computing device to perform tasks based on the user's spoken commands.

BRIEF DESCRIPTION OF DRAWINGS

For a more complete understanding of the present disclosure, reference is now made to the following description taken in conjunction with the accompanying drawings.

DETAILED DESCRIPTION

One aspect of multimedia playback is controlling output volume levels. Current interfaces require a user to manipulate a physical device to adjust volume such as a remote control, knob or slider, a digital up-down control, or a virtual equivalent thereof. Automatic speech recognition (ASR) may be used to control such interfaces, changing the volume by a fixed amount with a voice command (e.g., "volume up," "volume down"). Such interactions can be tedious and error prone. For example, "volume up" may increment the volume level by a small amount. If a user wishes to increase the volume level by a large amount, the command would need to be repeated several times. Similar incremental steps result from certain physical controls, such as a "volume up" or "volume down" button on a remote control. Different commands could also be used for different degrees of increase and decrease, but this requires the user to remember multiple voice commands for what should be a simple task.

Typical ASR systems specialize in identifying speech, and as such, they commonly discard data such as the sound intensity of recognized speed. However, by retaining such data and introducing a "match volume" command, the sound volume of multimedia playback may be increased and decreased with a single intuitive command. As used herein, "intensity" and "sound intensity" refer to the audible loudness or volume of sound, as well the corresponding electronic representation of the sound as a signal waveform, where the sound intensity of the waveform corresponds to audible loudness or volume when the electronic representation is audibly reproduced, such as when output by speakers. Thus, in reference to audible sounds and electronic representations of audible sounds, "intensity," "sound intensity," "volume," and "magnitude" may be used interchangeably.

Software running on a user's device, or on a backend system supporting the device over a network, analyzes the sound intensity of voice command audio samples and extracts a volume level, adjusting the volume of multimedia playback to match the volume of the user's voice when issuing the "match volume" command. For example, if a user says "match volume" very quietly, playback volume may be lowered to whisper levels, whereas if the user yells the same command, the volume may be raised to a preset maximum level. Combined with a "mute" and "unmute" voice commands, three commands may cover a full range of playback volumes from none to maximum.

Figure 1:
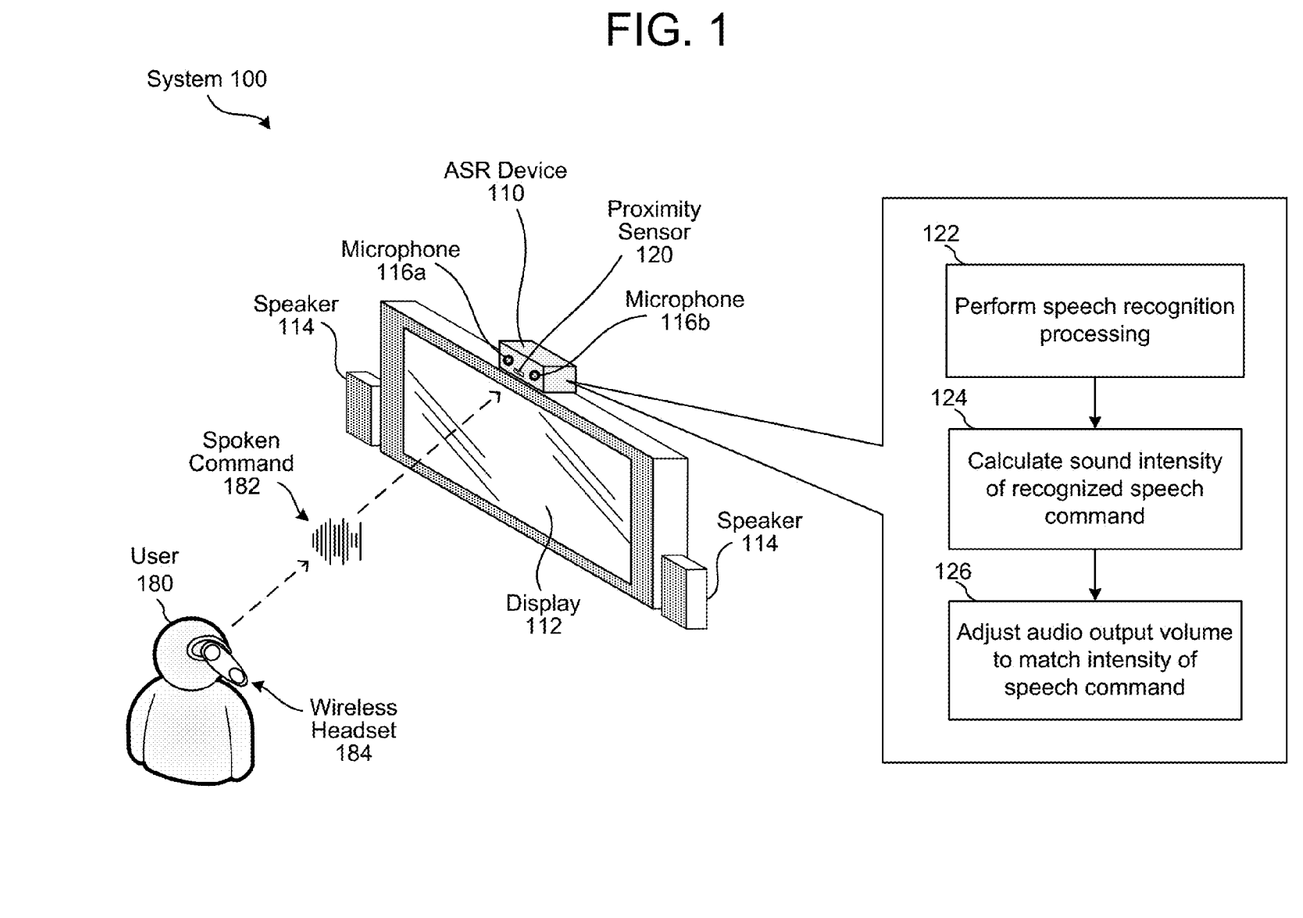
FIG. 1 illustrates a system for setting a volume of output audio based upon the sound intensity of a recognized voice command.

FIG. 1 illustrates a system 100 for recognizing a speech command to adjust output volume based on the volume of a voice command to do so. Multimedia including audio and video, or just audio, is output. Audio is output via speakers 114, wireless headset 184, or some other audio output device. Video is output via display 112.

A user (180) speaks the voice command 182, which is captured by microphones 116a and 116b, or by another audio capture device, such as a microphone on wireless headset 184. The automatic speech recognition (ASR) device 110 performs speech recognition processing (122) on the captured audio. The ASR device 110 may be connected to (or even located in) wireless headset 184. If a speech command is recognized that conveys to adjust the volume of the audio output, the ASR device 110 calculates (124) the sound intensity of the recognized speech command. The volume of the audio output is then adjusted based on the calculated intensity (126), approximately matching the volume of the output volume to the intensity of the speech command.

If the spoken command is captured at the ASR device 110 (i.e., via microphone(s) 116), the approximate distance between the ASR device 110 and the user 180 may be calculated. This enables the ASR device 110 to adjust for the loss in intensity of the spoken command 182 as it propagates toward the ASR device 110, since the user 180 presumably wishes volume to be adjusted based on their volume when the speech command is uttered, rather than the volume of the speech command as it is received. The approximate distance may be calculated using a proximity sensor 120, by performing acoustic localization based on time and amplitude differences between the spoken command as captured by an array of microphones (e.g., microphone 116a, 116b), or by other methods which will be discussed further below. Similarly, if the microphone is located at a different location (such as in the wireless headset 184 or elsewhere) calculations may be made to estimate the loss of intensity of the spoken command due to propagation from the user 180 to the microphone location.

Depending upon how the ASR device 110 is configured, the spoken command 182 may just be the command itself (e.g., "match volume"), or may be the command prefaced with a keyword, phrase, or sound that signals the ASR device 110 that the following word or phrase is intended as an instruction for the ASR device 110 (e.g., "attention computer, match volume").

Figure 2:
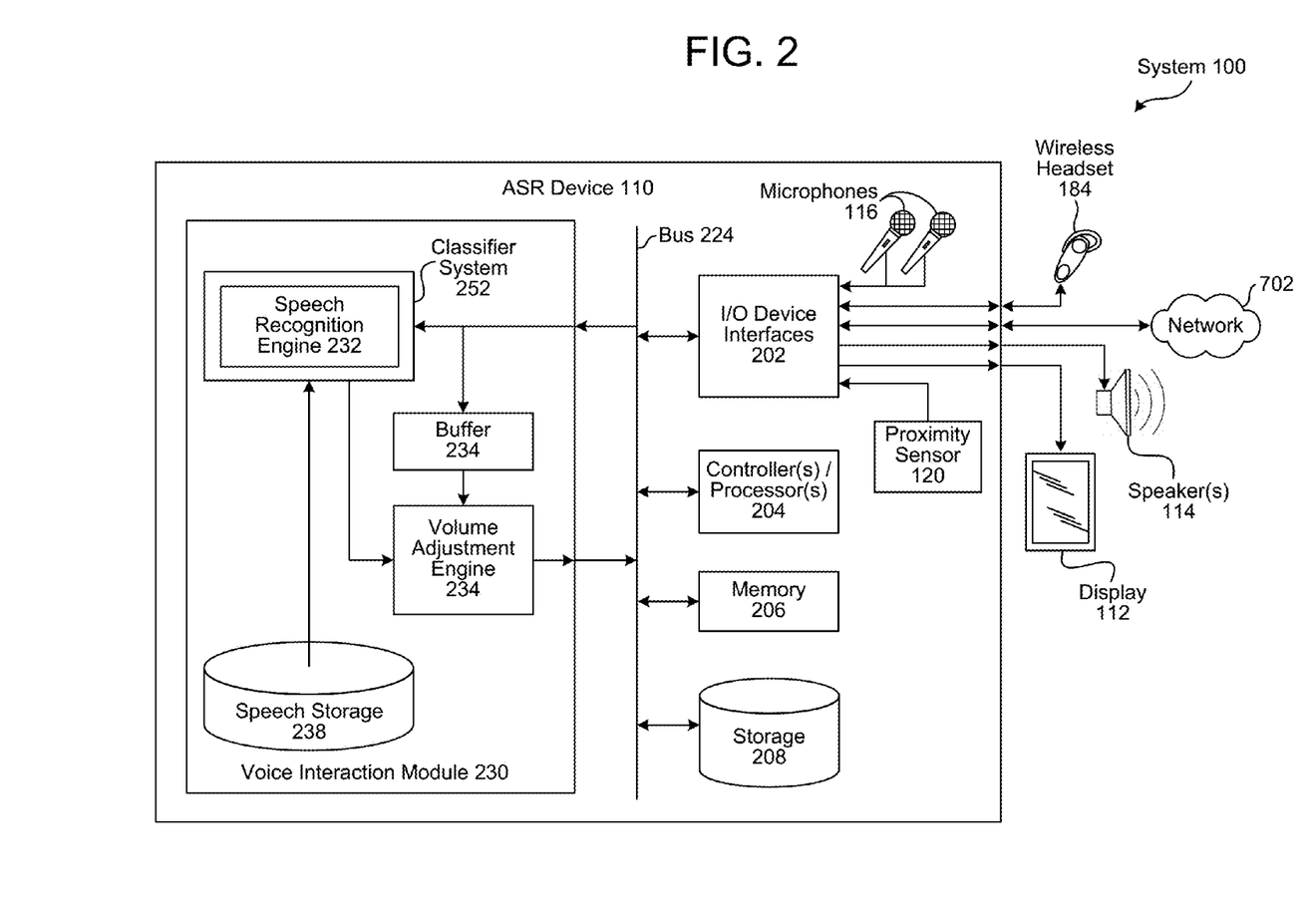
FIG. 2 is a block diagram conceptually illustrating a device for speech recognition processing to adjust the volume of output audio based upon the sound intensity of a recognized voice command.

FIG. 2 is a block diagram of example hardware components of the system 100. In operation, the system may include computer-readable and computer-executable instructions that reside on the ASR device 100, as will be discussed further below.

As illustrated in FIG. 2, the ASR device 110 may be connected to one or more audio capture device(s), such as a microphone or an array of microphones (e.g., microphones 116a, 116b) and wireless headset 184, for capturing spoken utterances and ambient noises for processing. The audio capture device(s) may be integrated into the ASR device 110 or may be separate.

The system 110 may also include an audio output device for producing sound, such as speaker(s) 114 and wireless headset 184. The audio output device may be integrated into the ASR device 110 or may be separate.

The system 100 may also include a video output device for displaying images, such as display 112. The video output device may be a display of any suitable technology, such as a liquid crystal display, an organic light emitting diode display, electronic paper, an electrochromic display, a cathode ray tube display, a pico projector or other suitable component(s). The video output device may be integrated into the ASR device 110 or may be separate.

The ASR device 110 may include an address/data bus 224 for conveying data among components of the ASR device 110. Each component within the ASR device 110 may also be directly connected to other components in addition to (or instead of) being connected to other components across the bus 224.

The ASR device 110 may include one or more controllers/processors 204, that may each include a central processing unit (CPU) for processing data and computer-readable instructions, and a memory 206 for storing data and instructions. The memory 206 may include volatile random access memory (RAM), non-volatile read only memory (ROM), non-volatile magnetoresistive (MRAM) and/or other types of memory. The device 100 may also include a data storage component 208, for storing data and instructions (e.g., instructions to perform the algorithms illustrated in FIGS. 4 and 5). The data storage component 208 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 202.

Computer instructions for operating the device 110 and its various components may be executed by the controller(s)/processor(s) 204, using the memory 206 as temporary "working" storage at runtime. The computer instructions may be stored in a non-transitory manner in non-volatile memory 206, storage 208, or an external device. Alternatively, some or all of the executable instructions may be embedded in hardware or firmware in addition to or instead of software.

The device 110 includes input/output device interfaces 202. A variety of components may be connected through the input/output device interfaces 202, such as the display 112, the speakers 114, the microphones 116, and the proximity sensor 120. The input/output device interfaces 202 may also include an interface for an external peripheral device connection such as universal serial bus (USB), FireWire, Thunderbolt or other connection protocol. The input/output device interfaces 202 may also include a connection to one or more networks 702 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. The headset 184 may connect to the device 110 via one of these connections. Through the network 702, the system 100 may be distributed across a networked environment, as will be discussed further below with FIG. 7.

The speech recognition engine 232 of the voice interaction module 230 processes received audio data. The speech voice interaction module may part of a classifier system 252 configured to perform speech recognition. The classifier system 252 may be, for example, a Support Vector Machine (SVM), although other machine learning techniques might be used instead of or to augment SVM. The classifier system 252 may utilize Hidden Markov Models (HMMs), Gaussian Mixture Models (GMMs), Mel-Frequency Cepstrum Coefficients (MFCCs), etc.

Automatic speech recognition (ASR) includes speech recognition and natural language processing. Speech recognition may comprise converting speech into text and/or determining whether a particular stored pattern (e.g., a word or phrase) corresponds to a stored pattern, whereas natural language processing (NLP) comprises determining the meaning of that text. Speech processing may include both ASR and NLP. Although the ASR device 110 may perform speech processing, volume-matching based on the intensity of a spoken command may be performed with just ASR or speech-pattern matching (i.e., NLP may be included, but is not required).

The speech recognition engine 232 of the classifier system 252 may transcribe audio data into text data representing the words of the speech contained in the audio data. This text data may then be used by other components for various purposes. A spoken utterance corresponding to a "match volume" command may be detected by the classifier system 252 comparing received audio with a pattern stored in speech storage 238, or the speech recognition engine 232 may output text to the volume adjustment engine 234 which recognizes a "match volume" command when the text matches the corresponding word or phrase.

Audio data is input to the voice interaction module 230 which then interprets the utterance based on the similarity between the utterance and models "known" to the speech recognition engine 232. These models may be stored in speech storage 238. The speech recognition engine 232 may, for example, compare the input audio data with models for sounds (e.g., speech units or phonemes) and sequences of sounds to identify words that match the sequence of sounds spoken in the utterance of the audio data. The speech recognition engine 232 may output the most likely words recognized in the audio data. The speech recognition engine 232 may also output multiple alternative recognized words in the form of a lattice or an N-best list.

Audio data may also be temporarily stored in a buffer 234. To determine an intensity of a voice command, when the "match volume" command is detected, the amplitude of audio data corresponding to the command as stored in the buffer may be used to determine the sound intensity of the speech command. As another approach, if the occurrence of the speech command is detected in the classifier system, the classifier system may perform the amplitude calculation, or may relay the isolated speech command to the volume adjustment engine 234 so that the volume adjustment engine 234 may perform the amplitude calculation.

If detecting a generic preface "command" word, phrase, or sound that is used to signal to the ASR device 110 that the utterance that follows is an instruction for the device (e.g., "attention computer" precedes "match volume"), recognition of the preface may be based on recognition of a stored sound pattern, or based on recognition of the preface appearing in the transcribed text.

The voice interaction module 230 may be connected to the bus 224, input/output device interfaces 202, controller(s)/processor(s) 204 and/or other component of the ASR device 110. Audio data sent to the voice interaction module 230 may come from the audio capture devices (e.g., microphone 114, headset 184) or may be received by another of the input/output device interfaces 202, such as audio data captured by a remote entity and sent to the ASR device 110 over a network 702.

The voice interaction module 230 may also include an acoustic front end (AFE) (not illustrated), which pre-processes the original captured audio data for processing by the classifier system 252. Among other pre-processing, the AFE may perform echo cancellation to remove the output audio from the captured audio. In the alternative, if (for example) the ASR Device 110 offers telephone functionality, echo cancellation may be built-in as a basic function, such as a function of the I/O device interfaces 202.

Examples of other speech recognition pre-processing that may be performed by the AFE include altering the sampling rate of the audio data, averaging the audio if audio data was captured on more than one channel (e.g., left and right), changing the format of the data, reducing distortion (e.g., if a loud noise picked up by audio capture device 212 saturates an amplification or analog-to-digital conversion stage within input/output device interfaces 202), applying a bandpass filter to eliminate extraneous frequencies and normalizing amplitudes to a bound dynamic range. Preprocessing may also perform pre-emphasis to increase the magnitude of some frequencies with respect to the magnitude of other frequencies in order to improve the overall signal-to-noise ratio.

The classifier system 252/speech recognition engine 232 and volume adjustment engine 234 may include their own controller(s)/processor(s) and memory, or they may use the controller(s)/processor(s) 204 and memory 206 of the ASR device 110. Similarly, the instructions for operating the classifier system 252/speech recognition engine 232 and volume adjustment engine 234 may be stored within the voice interaction module 230 (e.g., also include in speech storage 238), may be within the memory 206 and/or storage 208 of the ASR device 110, or within an external device.

Figure 3:
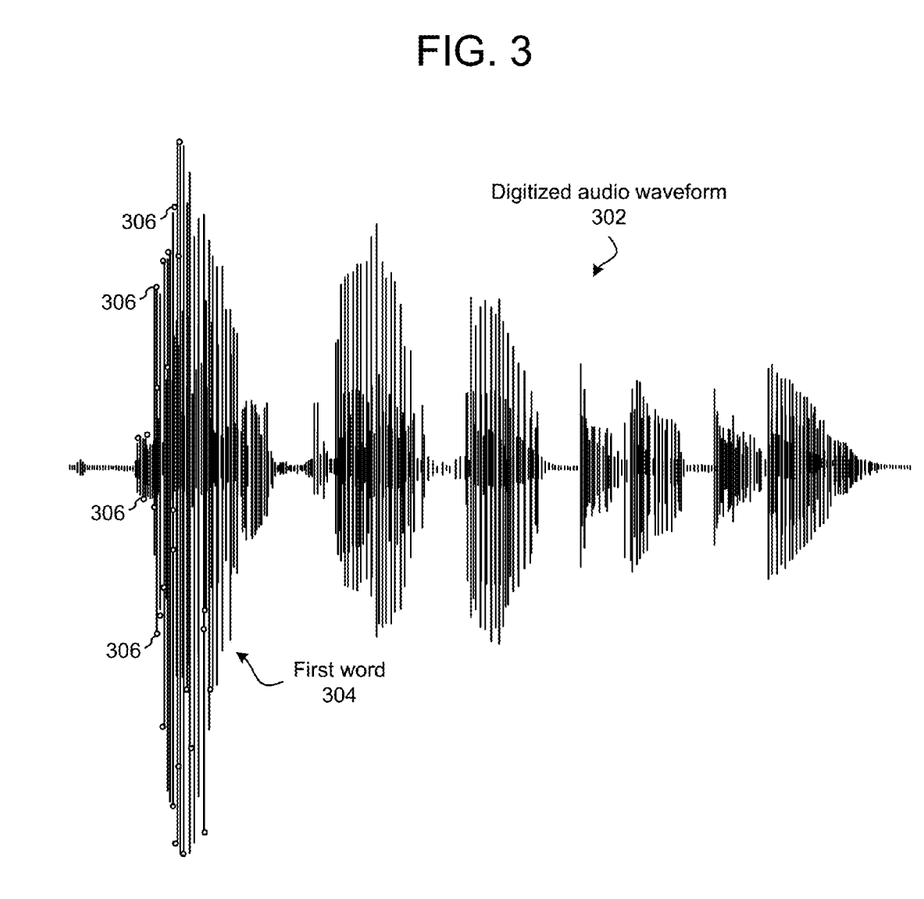
FIG. 3 illustrates an example of an audio waveform to be processed as speech.

FIG. 3 shows a digitized audio data waveform 302, with multiple points 306 of the first word 304 as the first word 304 is being processed. The audio qualities of those points may be stored into feature vectors. Feature vectors may be streamed or combined into a matrix that represents a time period of the spoken utterance. These feature vector matrices may then be processed by the speech recognition engine 232 of classifier system 252 to identify the first word 304.

The speech storage 238 may include a variety of information for speech recognition such as data matching pronunciations of phonemes to particular words. The speech storage 238 may also include a dictionary of words or a lexicon. The speech storage may also include data describing words that are likely to be used together in particular contexts.

The volume adjustment engine 234 adjusts the output volume based on the actual or relative intensity of the "match volume" speech command. If relative intensity is used, the volume adjustment engine 234 may compensate for, among other things, the approximate distance between the speaker 180 and the audio capture device, the pitch of the recognized speech command, and the intensity of ambient noise.

Distinguishing between ambient noise and speech may be performed by the classifier engine 252, with portions of the audio signal not corresponding to speech being classified as "noise." In the alternative, as discussed further below, an average acoustic amplitude "envelope" over time may be used to approximate ambient noise.

Examples of how distance to the speaker may be calculated include performing acoustic localization based on differences between sound captured by the different microphones 116, by using a proximity detector 120, by using the wireless signal from a device the user, and combinations thereof.

Calculating location and/or distance by acoustic localization may be performed by a variety of techniques such as acoustic beamforming. For example, when the user 180 speaks, beamforming techniques may be used to determine the user's direction and relative distance. Other passive acoustic source localization techniques maybe used, such as a time difference of arrival (TDOA) calculations.

The proximity sensor 120 may be, among other things, one or more cameras that perform face recognition, determining distance by comparing a detected face with an average face size to approximate distance, calculating parallax across two or more cameras to determine distance, approximating distance based on optical diffraction, or any of other conventional proximity sensor 120 technologies used to approximate distance. Using the proximity sensor 120 may be more error prone by itself than acoustic localization, since acoustic localization determines the origin of the spoken command 182, whereas the proximity detector 120 determines the location of motion, faces, etc., but the two technologies may be used together to more accurately determine distance than one technology alone. For example, the proximity detector 120 may detect multiple people, such that it may encounter difficulty determining the origin of the spoken command 182. However, by using acoustic localization, the volume adjustment engine 234 may identify the approximate location and distance of the speaker 180, and then refine the distance with data from the proximity sensor 120. Similarly, if a wireless device used by a user is connected to the ASR device 110 via a wireless connection, the ASR device 110 may be able to supplement other approximate location and distance data based on radio signals emanating the wireless device (a common functionality of multiple-input, multiple-output (MIMO) transceivers found in IEEE 802.11n and 802.11ac wireless LAN devices (WiFi), and 4G, WiMax, and Long Term Evolution (LTE) network devices).

Figure 4:
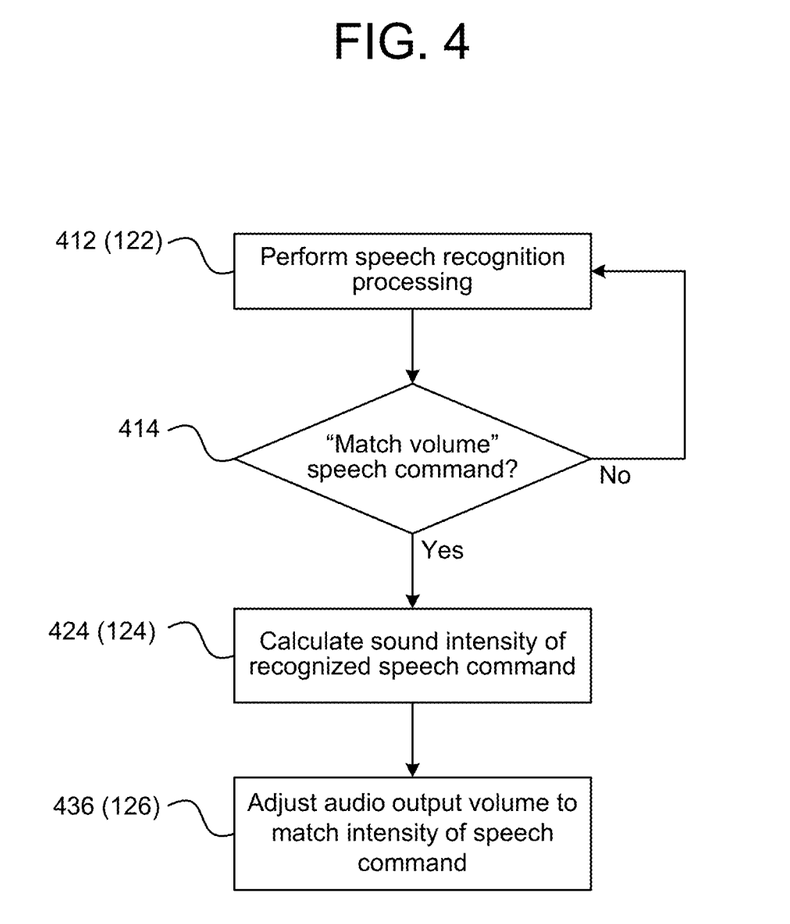
FIGS. 4 and 5 illustrate algorithms for setting a volume of output audio based upon the sound intensity of a recognized voice command.

FIG. 4 is a flow chart illustrating an example algorithm for implementing the steps shown in FIG. 1 on the ASR device 110. The speech recognition engine 232 performs speech recognition processing 412/122 on captured audio data. If recognized speech does not correspond to a "match volume" command (414 "No"), speech recognition processing continues without action by the volume adjustment engine 234. If recognized speech corresponds to the "match volume" speech command (414 "Yes"), the volume adjustment engine 234 (or the classifier system 252, depending upon configuration) calculates (424/124) the sound intensity of the recognized speech command. The calculated intensity may be based on the average amplitude of the speech command, but may also be based on the peak intensity. The volume adjustment engine 234 then adjust the audio output volume (436/126) to match the intensity of the speech command. This may comprise, among other things, sending an instruction to a control interface of an application running on controller(s)/processor(s) 204 that is generating the audio output, or sending an instruction to the operating system on controller(s)/processor(s) 204 to reduce system volume.

Figure 5:
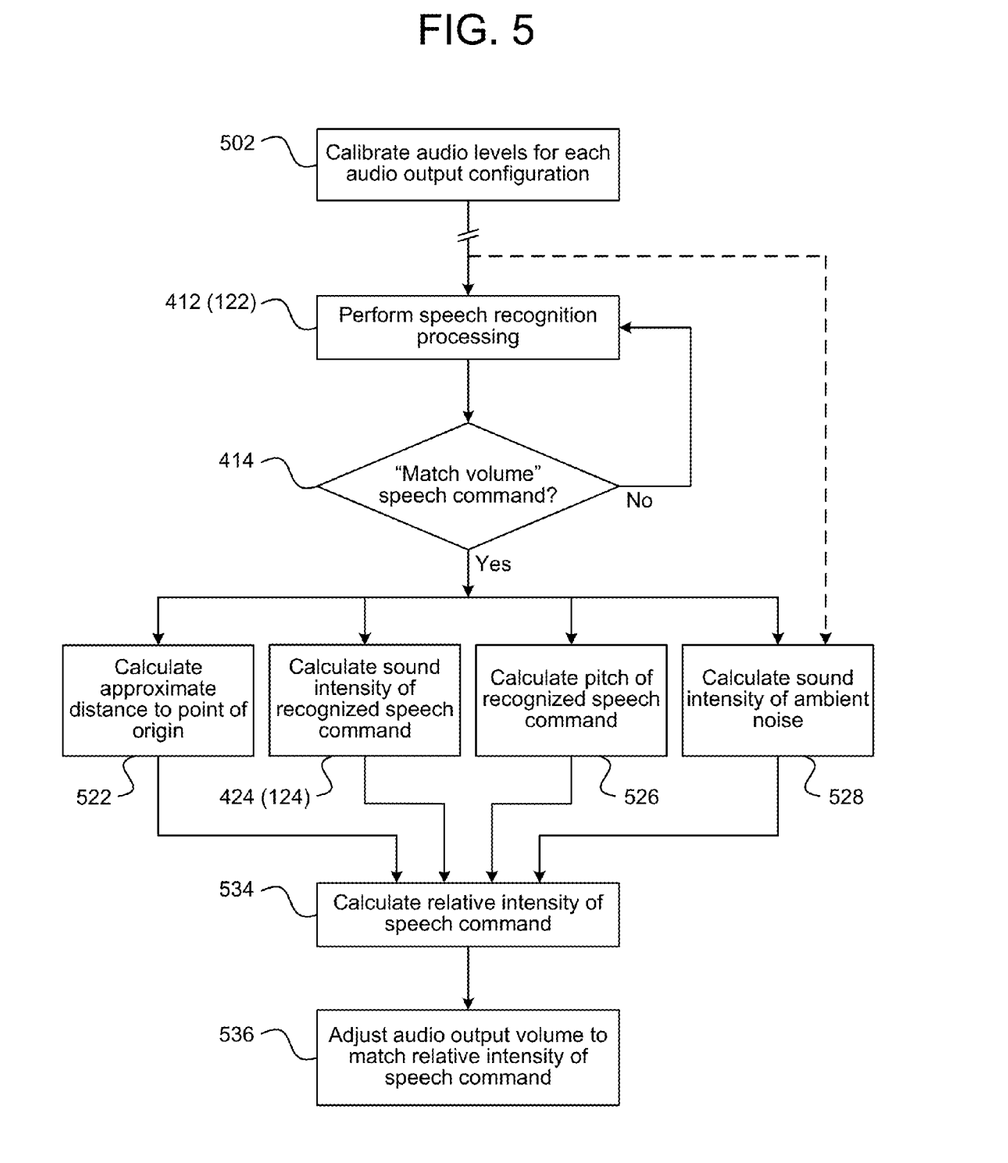

FIG. 5 expands on the algorithm in FIG. 4 to add additional functionality. Initially, when the system is set up, audio levels are calibrated (502) for each audio output configuration. For example, a first audio output configuration may be outputting audio audibly through speakers 114, while a second audio output configuration may be outputting audio to headphones such as wireless headset 184.

In the case of outputting audio audibly (e.g., audibly to microphones 116 of the ASR device 110), the volume adjustment engine 234 may cause a series of tones to be output via the speakers 114 to determine the acoustic parameters of the system 100 in the space/room in which it is set up, testing (for example) a variety of frequencies and output signal magnitudes to determine how a signal magnitude corresponds to the audible volume. For a more elaborate calibration, the user 180 may speak at specified volumes (e.g., quiet, normal, loud), at a variety of distances from the device 110.

Even if the device 110 is not being set up at a fixed location (e.g., device 110 is a mobile device), calibration of audible audio output may be performed to determined baseline performance parameters for audio output and captured audio across a variety of frequencies, such as frequencies corresponding to a range of human speech.

If headphones are used, calibration may consist of having the user 180 set audio output minimums and maximums, and determining a sensitivity of a microphone, if built into the headphones (e.g., a microphone built into wireless headset 184).

The speech recognition engine 232 then performs speech recognition processing 412/122 on captured audio. If a "match volume" speech command is recognized (414 "Yes"), in addition to calculating the sound intensity of a recognized speech command 424/124, several other calculations may be performed.

As discussed above, the approximate distance to the point of origin of the speech command 182 may be calculated (522), as discussed above. Among other things, with this data that intensity of the speech command at the speaker 180, rather than at the device 110, can be determined (e.g., causing the volume adjustment engine 234 to increase the relative intensity of the received speech command in comparison to the intensity as it is received).

The volume adjustment engine 234 may also calculated a pitch (e.g., center or average frequency) of the speech command, or a range of the pitch (i.e., the range of frequency components included in the speech command). Based on the calibration data (i.e., from step 502), the pitch data can be used to normalize the relative intensity of the speech command. For example, if calibration indicates that the system 100 is more sensitive to frequencies near the top of the range of frequencies comprising human speech than frequencies near the bottom of the range, the relative intensity of voice commands at higher pitches may be reduced, whereas the relative intensity of voice commands at lower pitches may be increased, normalizing the response of the system so that the output volume is normalized to be approximately the same for a same speech intensity without regard to the pitch of the speaker's voice.

Figure 6:
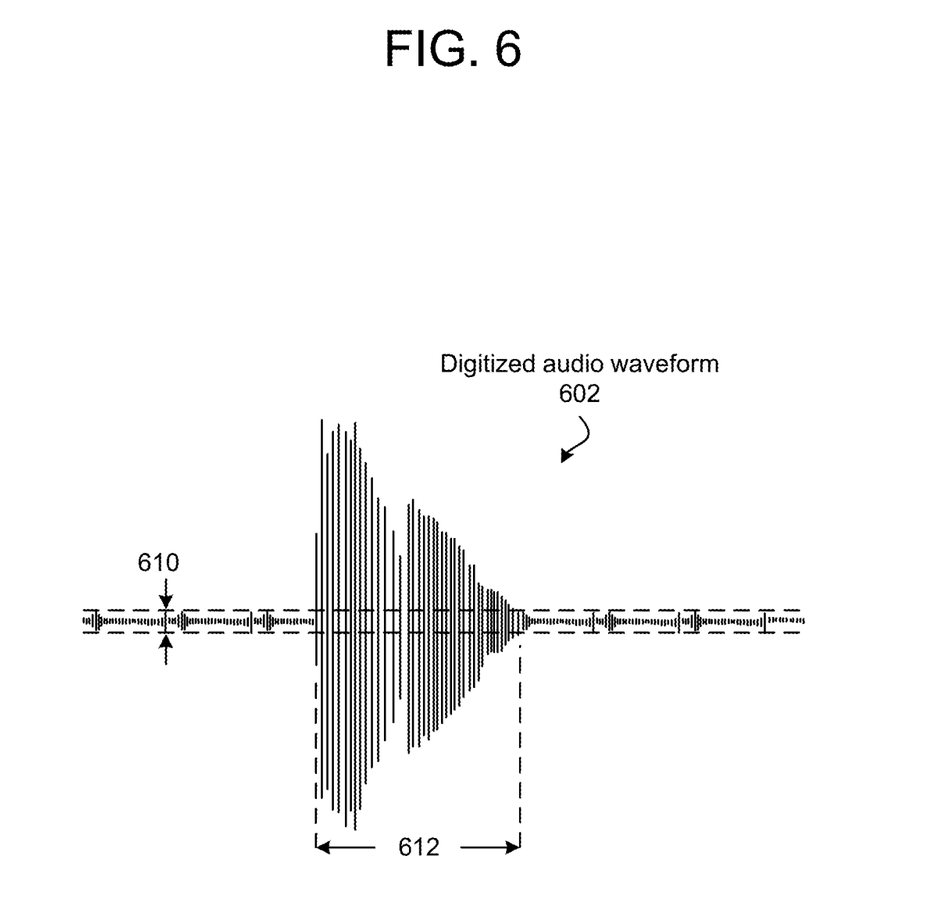
FIG. 6 illustrates measurement of a background acoustic noise envelope.

The volume adjust engine 234 and/or classifier system 252 may also calculate the sound intensity of ambient noise (528). Referring to FIG. 6, a digitized audio waveform 602 corresponding to captured audio is illustrated comprising an ambient noise envelope 610 and a pattern 612 corresponding to a spoken utterance. The noise envelope 610 may be the average of all volume over time, or may be calculated by classifier system 252 based on an average amplitude of captured audio that is not recognized as speech (or captured audio in the frequency range of speech that is not recognized as speech). If the ambient noise envelope 610 is large, indicating relatively load ambient noise, the speaker 180 may be speaking louder than they realize when they issue the speech command 182. Therefore, if there is a large amount of ambient noise, volume adjustment engine 234 may reduce the relative intensity of the speech command.

Referring to FIG. 5, the volume adjustment engine 234 calculates a relative intensity of the speech command (534) based on the available data. The volume adjustment engine 234 then adjust the output volume to match the intensity of the speech command as described in FIGS. 1 and 4 (i.e., 436/126), but adjusts the magnitude/volume based on the calculated relative intensity (536), rather than the intensity of the recognized speech command alone.

Multiple ASR devices 110 may be employed in a single speech recognition system. In such a multi-device system, each of the ASR devices 110 may include different components for performing different aspects of the speech recognition process. The multiple devices may include overlapping components. The components of ASR device 110 as illustrated in FIG. 2 is exemplary, and may be a stand-alone device or may be included, in whole or in part, as a component of a larger device or system.

The concepts disclosed herein may be applied within a number of different devices and computer systems, including, for example, general-purpose computing systems, multimedia set-top boxes, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

Figure 7:
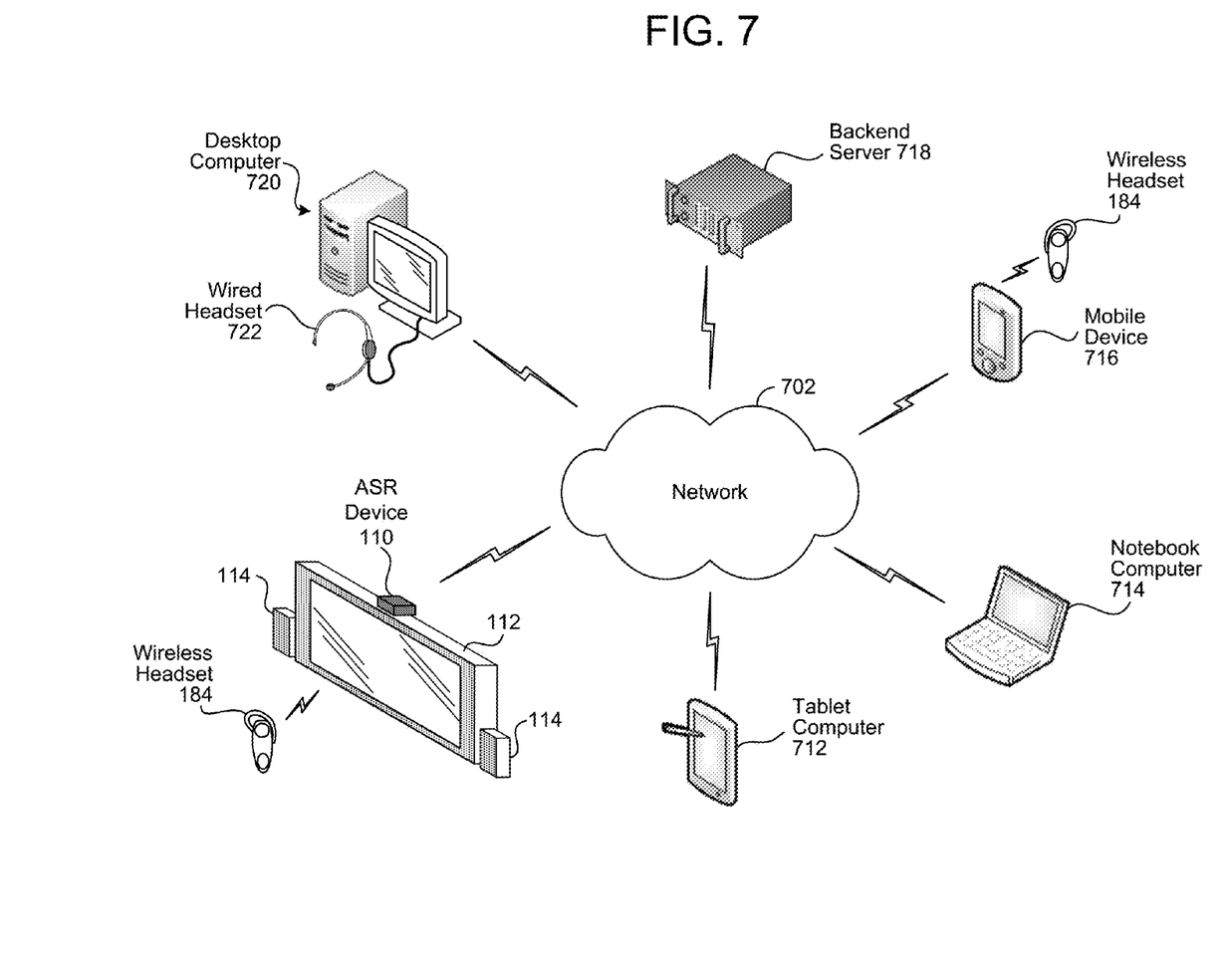
FIG. 7 illustrates an example of a computer network for use with the device performing speech recognition processing in a distributed environment.

As shown in FIG. 7, multiple devices may be connected over network 702 in a distributed processing arrangement. Network 702 may include a local or private network or may include a wide network such as the internet. Devices may be connected to the network 702 through either wired or wireless connections. For example, a mobile device 716, a notebook computer 714, and a tablet computer 712 may be connected to the network 1102 through a wireless service provider. Other devices, such as a desktop computer 720 and a backend server 718 may connect to the network 702 through a wired connection. Networked devices may capture spoken audio through a number of audio input devices including through headsets 184 and 722. Audio input devices may be connected to networked devices either through a wired or wireless connection. Networked devices may also include embedded audio input devices, such as an internal microphone (not pictured) in the notebook computer 714 and tablet computer 712.

In certain system configurations, one device may capture an audio signal and another device may perform the speech recognition processing. For example, audio input to the headset 722 may be captured by desktop computer 720 and sent over the network 702 to the ASR device 110 for processing. Or desktop computer 720 may partially process the captured audio, such as if the desktop computer 720 includes at least the speech recognition engine 232, and then sent a recognized speech command to the volume adjustment engine 234 on the device 110 via the network 702.

Likewise, speaker localization calculations may be performed by the backend server 718, separate from both the device capturing the spoken utterances and the device outputting the audio. Because speech recognition processing and calculating an approximate distance between a speaker and the audio capture device may involve significant computational resources, in terms of both storage and processing power, such distributed configurations may be employed where the device capturing the audio has lower processing capabilities than a remote device and higher quality results are desired. The audio capture may occur near a user and the captured audio signal sent to another device for processing.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, digital imaging and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

In addition, as an alternative to a software implementation, the volume adjustment engine 234 may be implemented as firmware or as a state machine in hardware. For example, at least the volume adjustment engine 234 of the voice interaction module 230 may be implemented as an application specific integrated circuit (ASIC), a digital signal processor (DSP), a field programmable gate array (FPGA), or some combination thereof.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    outputting a first audio via at least one speaker;
    capturing a second audio via at least one microphone;
    generating audio data corresponding to a representation of the first audio removed from the second audio;
    performing speech recognition processing on the audio data;
    determining, based on the speech recognition processing, that the audio data corresponds to an utterance of a volume change command to match a volume of output audio to an estimated volume of the utterance;
    determining the estimated volume of the utterance, wherein the estimated volume is calculated based on an estimated loss of intensity of the utterance from a first location where the utterance was spoken to a second location of the at least one microphone; and
    outputting, via the at least one speaker, a third audio at the estimated volume.

2. The computer-implemented method of claim 1, wherein the estimated volume is estimated based on an average of an amplitude of the audio data over a duration of the utterance.

3. The computer-implemented method of claim 1, further comprising:
    determining acoustic characteristics for calibration by outputting sounds at a plurality of frequencies within a range of human speech and capturing the output sounds; and
    calculating a pitch of the audio data,
    wherein determining the estimated volume includes compensating for the acoustic characteristics based on the pitch.

4. The computer-implemented method of claim 1, wherein the at least one microphone is a plurality of microphones, the method further comprising:
    performing acoustic localization to estimate a distance from the first location to the second location based at least in part on differences between second audio captured by each of the plurality of microphones,
    wherein determining the estimated volume includes compensating for the distance.

5. A computing device, comprising:
    at least one processor;
    memory including instructions operable to be executed by the at least one processor to perform a set of actions, configuring the at least one processor to:
        receive an input audio signal generated by a microphone at a first location, the input audio signal representing audio originating at a second location a distance away from the first location;
        perform speech recognition processing on the input audio signal;
        determine, based on the speech recognition processing, that the input audio signal corresponds to an utterance of a command to match a volume of output audio to a volume of the utterance;
        determine an estimated sound intensity of the audio, wherein the estimated sound intensity is calculated based on an estimated loss of intensity of the audio from the second location to the first location; and
        causing output audio to be output at the estimated sound intensity.

6. The computing device of claim 5, wherein the instructions to determine the estimated sound intensity further include instructions to determine the estimated sound intensity based at least in part on an average of an amplitude of the input audio signal.

7. The computing device of claim 5, wherein the instructions to determine the estimated sound intensity further include instructions to determine the estimated sound intensity based on a maximum of an amplitude of the input audio signal.

8. The computing device of claim 5, the instructions further configuring the at least one processor to calibrate at least a maximum intensity of the output audio, as output by a first audio output device, based on an amplitude of at least one received audio reference signal.

9. The computing device of claim 5, the instructions further configuring the at least one processor to:
    determine a pitch of the input audio signal of the command, and
    adjust a volume of the output audio based on the pitch and the distance.

10. The computing device of claim 5, the instructions further configuring the at least one processor to:
    estimate a value corresponding to the distance,
    wherein the instructions to determine the estimated sound intensity further include instructions to determine the estimated sound intensity based on the value.

11. The computing device of claim 10, wherein the audio capture device comprises a plurality of microphones, and the instructions further configure the at least one processor to:
perform acoustic localization based on differences between captured sound as captured by each of the plurality of microphones,
wherein the instructions to estimate the value further include instructions to estimate the value based at least in part on the acoustic localization.

12. The computing device of claim 5, the instructions further configuring the at least one processor to:
calculate a value corresponding to ambient background noise included in the input audio signal,
wherein the instructions to determine the output audio signal further include instructions to determine the output audio signal based at least in part the value.

13. A computer-implemented method, comprising:
receiving an input audio signal generated by a microphone at a first location, the input audio signal representing audio originating at a second location a distance away from the first location;
performing speech recognition processing on the input audio signal;
determining, based on the speech recognition processing, that the input audio signal corresponds to an utterance of a command to match a volume of output audio to a volume of the utterance;
determining an estimated sound intensity of the audio, wherein the estimated sound intensity is calculated based on an estimated loss of intensity of the audio from the second location to the first location; and
causing output audio to be output at the estimated sound intensity.

14. The computer-implemented method of claim 13, further comprising:
determining the estimated sound intensity based at least in part on an average of an amplitude of the input audio signal.

15. The computer-implemented method of claim 13, further comprising:
determining the estimated sound intensity based on a maximum of an amplitude of the input audio signal.

16. The computer-implemented method of claim 13, further comprising:
calibrating at least a maximum intensity of the output audio, as output by a first audio output device, based on an amplitude of at least one received audio reference signal.

17. The computer-implemented method of claim 13, further comprising:
determining a pitch of the input audio signal of the command; and
adjusting a volume of the output audio signal based on the pitch and the distance.

18. The computer-implemented method of claim 13, further comprising:
estimating a value corresponding to the distance; and
determining the output audio based on the value.

19. The computer-implemented method of claim 18, wherein an audio capture device comprises a plurality of microphones including the microphone, and wherein the computer-implemented method further comprises:
performing acoustic localization based on differences between captured sound as captured by each of the plurality of microphones; and
estimating the value based at least in part on the acoustic localization.

20. The computer-implemented method of claim 13, further comprising:
calculating a value corresponding to ambient background noise included in the input audio signal; and
determining the output audio based at least in part on the value.

21. The computing device of claim 5, wherein the command comprises a wakeword portion and a command portion.

* * * * *